United States Patent Office 3,577,447
Patented May 4, 1971

3,577,447
ALKANOYL DERIVATIVES OF FLUORINATED AMIDES
Richard F. Sweeney, Randolph Township, and Alson K. Price, Morris Township, Morris County, N.J., assignors to Allied Chemical Corporation, New York, N.Y.
No Drawing. Filed Aug. 1, 1968, Ser. No. 749,316
Int. Cl. C09f 7/00
U.S. Cl. 260—404.5
18 Claims

ABSTRACT OF THE DISCLOSURE

Alkanoyl derivatives of fluorinated amides useful as oil-repellency agents have the structural formula

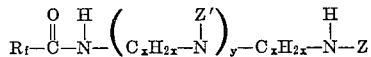

wherein $x$ and $y$ are integers from 2 to 6 and 1 to 4, respectively; wherein $R_f$ is a perfluoroalkyl or a fluorinated isoalkoxyalkyl radical; Z is H, alkyl, hydroxyalkyl, a fluorinated acyl radical $R_fCO$— wherein $R_f$ is as described above, or a hydrocarbon acyl radical; Z' is H, alkyl, hydroxyalkyl, a fluoroinated acyl radical $R_fCO$— wherein $R_f$ is as described above, a hydrocarbon acyl radical or a radical of the formula —$C_xH_{2x}NHZ$ wherein $x$ and Z are as described above, there being at least one fluorinated acyl radical $R_fCO$— and at least one hydrocarbon acyl radical in the molecule represented by Z and/or Z'.

BACKGROUND OF THE INVENTION

This invention relates to novel fluorocarbon derivatives. More particularly, this invention is concerned with alkanoyl derivatives of fluorinated amides, valuable as oil-repellency agents.

Accordingly, it is an object of the present invention to provide novel fluorocarbon compounds.

It is another object to provide alkanoyl derivatives of fluorinated amides suitable for treating textiles and paper to impart thereto oleophobic properties.

These and other objects will be apparent from the following description.

DESCRIPTION OF THE INVENTION

The compounds of the present invention have the structural formula

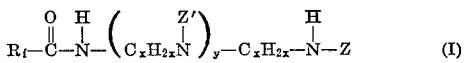 (I)

wherein (1) $R_f$ is a radical selected from the group consisting of
(a) perfluoroalkyl having from 3 to 17 carbon atoms, and
(b) a radical having the formula

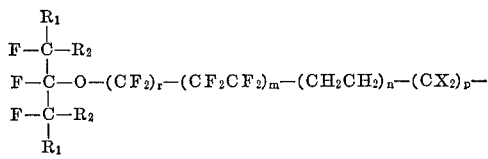

wherein (i) $R_1$ and $R_2$ are fluorine or are fluoroalkyl groups, or when taken together, are fluoroalkylene groups forming a homocyclic aliphatic structure, which $R_1$ and $R_2$ groups may each have from 1 to 9 carbon atoms, provided that not more than three of the $R_1$ and $R_2$ groups may be fluoroalkyl groups,
(ii) $m$ and $n$ are each integers of from 0 to 20, with the proviso that the sum of $m$ and $n$ is from 0 to 20, and provided further that when $r$ is 0, $m$ is at least 1,
(iii) X is selected from the group consisting of hydrogen and fluorine, with the proviso that when $n$ is greater than 0, then X is always hydrogen,
(iv) $p$ is 0 or 1,
(v) $r$ is 0 or 1, with the proviso that when the sum of $m$, $n$ and $p$ is greater than 0, then $r$ is always 0,
(2) $x$ is an integer from 2 to 6,
(3) $y$ is an integer from 1 to 4,
(4) Z is a member selected from the group consisting of
(a) hydrogen,
(b) alkyl having from 1 to 6 carbon atoms,
(c) a radical having the formula —ROH wherein R is a divalent alkylene bridging group containing from 1 to 6 carbon atoms,
(d) a fluorinated acyl radical having the formula

wherein $R_f$ has the afore-stated meaning, and
(e) a hydrocarbon acyl radical having the formula

wherein $R^a$ is an alkyl radical having from 10 to 40 carbon atoms, and
(5) Z', which may be the same or different in different

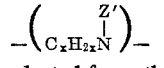

groups, is a member selected from the group consisting of
(a) hydrogen,
(b) alkyl having from 1 to 6 carbon atoms,
(c) a radical having the formula —ROH wherein R is a divalent alkylene bridging group containing from 1 to 6 carbon atoms,
(d) a fluorinated acyl radical having the formula

wherein $R_f$ has the afore-stated meaning,
(e) a hydrocarbon acyl radical having the formula

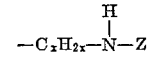

wherein $R^a$ has the afore-stated meaning, and
(f) a radical having the formula

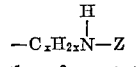

wherein $x$ and Z have the afore-stated meanings, with the proviso that at least one of Z or Z' is a fluorinated acyl radical or one of Z' is a radical having the formula

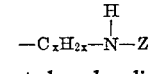

wherein Z is a fluorinated acyl radical, and at least one of Z or Z' is a hydrocarbon acyl radical or one of Z' is a radical having the formula

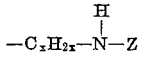

wherein Z is a hydrocarbon acyl radical, said fluorinated acyl radical and hydrocarbon acyl radical having the afore-stated formulas.

The novel fluorocarbon derivatives of the present invention are prepared by reacting a fluorine-containing polyamide starting material as hereinbelow defined with a hydrocarbon acyl halide reactant at temperatures between about 0° C. to about 160° C. preferably in the presence of an inert organic solvent.

The hydrocarbon acyl halide reactants employed in the preparation of the novel fluorocarbon derivatives of the present invention are known compounds which are represented by the formula

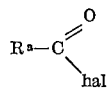

wherein hal is fluorine, chlorine, bromine or iodine, and wherein $R^a$ is a straight-chain or branched-chain alkyl radical having from 10 to 40 carbon atoms.

The fluorine-containing polyamide reactant suitable for reaction with the above hydrocarbon acyl halide reactants is characterized by the structural formula:

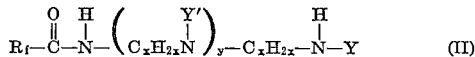         (II)

wherein $R_f$, $x$ and $y$ have the above-stated meanings; Y is a member selected from the group consisting of hydrogen, alkyl having from 1 to 6 carbon atoms, a radical having the formula —ROH wherein R has the above-stated meaning and a fluorinated acyl radical having the formula

wherein $R_f$ has the above-stated meaning and Y', which may be the same or different in different

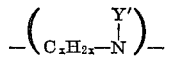

groups, is a member selected from the group consisting of hydrogen, alkyl having from 1 to 6 carbon atoms, a radical having the formula —ROH wherein R has the above-stated meaning, a fluorinated acyl radical having the formula

wherein $R_f$ has the above-stated meaning and a radical having the formula

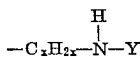

wherein $x$ and Y have the above-stated meanings, with the proviso that at least one of Y or Y' is a fluorinated acyl radical or one of Y' is a radical having the formula

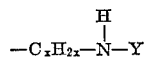

in which $x$ is as stated above, and Y is a fluorinated acyl radical, said fluorinated acyl radical having the afore-stated formula, and at least one of Y or Y' is hydrogen.

The fluorine-containing polyamide reactant of Formula II, above, is prepared by reaction of a fluorinated carboxylic acid having the formula $R_fCOOH$ wherein $R_f$ has the afore-stated meaning, or a derivative thereof, such as an ester, anhydride or acid halide thereof with a polyalkylene polyamine compound corresponding to the general formula

         (III)

wherein $x$ and $y$ have the afore-stated meanings; wherein Q is selected from the group consisting of hydrogen, alkyl having from 1 to 6 carbon atoms, and a radical having the formula —ROH wherein R has the afore-stated meaning; and wherein Q' is selected from the group consisting of hydrogen, alkyl having from 1 to 6 carbon atoms, a radical having the formula —ROH wherein R has the afore-stated meaning, or an aminoalkyl radical having the formula —$C_xH_{2x}$NHQ wherein $x$ and Q have the afore-stated meanings; there being at least two hydrogen atoms in the molecule represented by Q and/or Q'.

The polyalkylene polyamine compounds of Formula III, above, employed in the preparation of the fluorine-containing polyamide reactants of Formula II, above, as a class, are known compounds. These compounds may be straight-chain or branched-chain compounds and may be used in the form of a single compound, as a mixture of isomers or as a mixture of polyamines containing from 3 to 6 nitrogen atoms in the molecule. Specific examples of polyalkylene polyamines employable herein include diethylene triamine, di-n-propylene triamine, di-i-butylene triamine, di-n-hexylene triamine, triethylene tetramine, tri-i-propylene tetramine, tri-n-hexylene tetramine, 4-(2-aminoethyl)-diethylene triamine, tetraethylene pentamine, tetra-n-propylene pentamine, tetra-n-butylene pentamine, 4-(2 - aminoethyl) - 1,4,7,10 - tetraazadecane, tetra-n-hexylene pentamine, pentaethylene hexamine, 1-(hydroxyethyl)-4-methyl - 1,4,7 - triazaheptane, 1,4-dimethyl-8-(6-hydroxyhexyl)-1,4,8,12 - tetraazadodecane, 1-(6-hydroxyhexyl)-6,11-dimethyl-1,6,11,16,21 - pentaazaheneicosane, 1,4-bis(2-hydroxyethyl) - 1,4,7,10 - tetraazadecane, and 3-methyl-1,5,9-triazanonane. These polyalkylene polyamines can be prepared by standard methods known to those skilled in the art. Preferred polyalkylene polyamines are diethylene triamine, dipropylene triamine, triethylene tetramine and tetraethylene pentamine since these are the more readily commercially available compounds.

Fluorinated carboxylic acid reactants, above described, wherein $R_f$ is perfluoroalkyl, suitable for reaction with the above polyalkylene polyamine reactants are saturated straight-chain or branched-chain monocarboxylic acids or stated derivatives thereof containing from 4 to 18 carbon atoms in the acid portion of the molecule. Discrete molecular species of the perfluorocarboxylic acid reactants may be used or mixtures of these reactants in various proportions having the indicated carbon chain length may be employed. Illustrative perfluorocarboxylic acid reactants include perfluorobutyric, perfluorocaproic, perfluorocaprylic, perfluorolauric, perfluoromyristic, perfluoropalmitic, and perfluorostearic acids, as well as various isomeric forms thereof.

Perfluorocarboxylic acid reactants herein contemplated containing up to about ten carbon atoms are readily prepared by the electrochemical fluorination of alkanoic acids in anhydrous hydrogen fluoride with subsequent hydrolysis of the resulting fluorinated acid fluorides, as disclosed in U.S. Pat. 2,567,011, issued Sept. 4, 1951. Longer chain perfluorocarboxylic acid reactants, i.e. those containing from about 11 to 18 carbon atoms, may be obtained by reaction of perfluoroalkyl iodides with oleum containing about 15% to 45% sulfur trioxide at elevated temperatures followed by hydrolysis of the resulting perfluorocarboxylic acid fluoride, as disclosed in French Pat. 1,343,601 of Oct. 14, 1963.

Fluorinated carboxylic acid reactants, above described, wherein $R_f$ is a radical having the formula

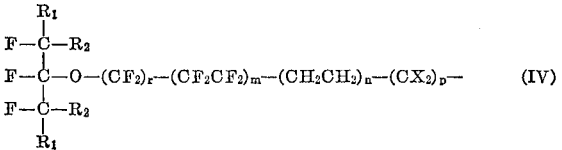         (IV)

wherein $R_1$, $R_2$, X, $r$, $n$, $m$ and $p$ have the afore-stated meanings may be prepared by various hereinafter described methods.

Fluorinated carboxylic acids of the formula $R_fCOOH$ wherein $R_f$ has the Formula IV, above, wherein $r$ is 0, $m$ is at least 1 and the sum of $n$ and $p$ is at least 1, can be prepared from telomers having the general formula

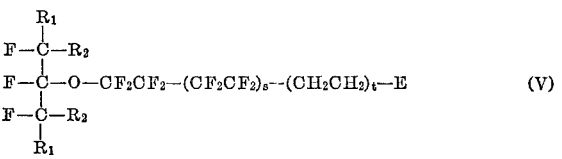         (V)

wherein $R_1$ and $R_2$ have the afore-stated meanings, wherein $s$ and $t$ are each integers from 0 to 20, the sum of $s$ and $t$ being at least 1, and wherein E is a halogen selected from the group consisting of Br and I. Telomers of that type and their preparation are described in commonly assigned copending application of Anello et al., entitled, "Telomers and Process for the Preparation Thereof," Ser. No. 633,359, filed Apr. 25, 1967, now U.S. Pat. 3,514,487, the pertinent subject matter of which is hereby incorporated by reference. By way of general description, these telomers are prepared by radical addition reactions of polyfluoroisoalkoxyalkyl halide telogens of the formula

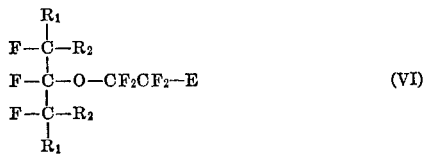

(VI)

wherein $R_1$, $R_2$ and E have the afore-stated meanings, with telomerizable unsaturated compounds. The telomerization reaction may be initiated by heat or by means of a free radical initiating catalyst. The polyfluoroisoalkoxyalkyl halide telogen starting materials may be prepared by reacting a corresponding halogenated ketone with an ionizable fluoride salt, e.g. CsF, to form a fluorinated organic salt and then reacting the organic salt with a halogen other than fluorine or chlorine and tetrafluoroethylene. Preparation of the telogen starting materials is described in detail in copending applications of Litt et al., "Fluorinated Ethers," U.S. Ser. Nos. 492,276 and 513,574, filed Oct. 1, 1965, and Dec. 13, 1965 respectively, now U.S. Pats. 3,453,333 and 3,470,256 respectively, the pertinent subject matter of which applications is hereby incorporated by reference.

Fluorinated carboxylic acids of the formula $R_fCOOH$ wherein $R_f$ has the Formula IV, above, wherein $r$, $n$ and $p$ are all 0 and wherein $m$ is at least 2, may be prepared by reacting the corresponding telomer represented by Formula V, above, wherein $t$ is 0 with ICN or $(CN)_2$ to form the nitrile, followed by hydrolysis of the nitrile in known manner to form the free acid. The reaction between the telomer and the ICN or $(CN)_2$ to form the nitrile is carried out under superatmospheric pressure above about 20 to 200 atmospheres or more at temperatures in excess of about 300° C., preferably using an excess of the ICN or $(CN)_2$ reactant. Hydrolysis of the nitrile to form the free acid can be effected by treatment with aqueous mineral acid, such as hydrochloric, phosphoric, or sulfuric acid, at temperatures between about 60° and about 125° C.

Fluorinated carboxylic acids of the Formula $R_fCOOH$ wherein $R_f$ has the Formula IV, above, wherein $m$ is at least 1, $p$ and $r$ are both 0 and $n$ is greater than 0 may be prepared by reacting the corresponding telomer represented by Formula V, above, wherein $t$ is greater than 0 with an alkali metal cyanide to form the nitrile, followed by hydrolysis of the nitrile to form the free acid, as described above. The reaction between the telomer and the alkali metal cyanide is preferably carried out in aqueous alcoholic solution at temperature between about 60° C. and about 100° C.

Fluorinated carboxylic acids of the formula $R_fCOOH$ wherein $R_f$ has the Formula IV, above, wherein $m$ is at least 1, $r$ is 0, $p$ is 1 and X is hydrogen can be prepared by reacting the corresponding telomer represented by general Formula V, above, wherein $t$ is at least 1 with $SO_3$ to form the corresponding pyrosulfate, or with oleum to form the corresponding hydrosulfate, hydrolysis of the pyrosulfate or the hydrosulfate with aqueous acid to form the corresponding alcohol, followed by oxidation of the alcohol with dichromate, permanganate or strong nitric acid to form the free acid.

Fluorinated carboxylic acids of the formula $R_fCOOH$ wherein $R_f$ has the Formula IV, above, wherein $m$ is at least 1, $r$ and $n$ are both 0, $p$ is 1 and X is fluorine can be prepared by reacting a corresponding telomer represented by Formula V, above, wherein $t$ is 0 with $SO_3$ to form corresponding acid halides and fluoropyrosulfates and hydrolyzing the acid halides and fluoropyrosulfates by refluxing with water to obtain the corresponding free acids. Fluorinated carboxylic acids of the formula $R_fCOOH$ wherein $R_f$ has the Formula IV, above, wherein $r$ is 1 and $m$, $n$ and $p$ are all 0 can be prepared by the same method from polyfluoroisoalkoxyalkyl halide compounds of Formula VI, above.

Fluorinated carboxylic acids of the formula $R_fCOOH$ wherein $R_f$ has the Formula IV, above, where $m$ is 1 and $r$, $n$ and $p$ are all 0 can be prepared from polyfluoroisoalkoxyalkyl halide compounds of Formula VI, above, by reacting them with a Grignard reagent to form a magnesium halide adduct, reacting this adduct with $CO_2$ to form a magnesium halide salt, and then acidifying the salt to obtain the desired acid. The reaction involving the Grignard reagent and the carbon dioxide proceed very rapidly and can be conducted at temperatures considerably below 0° C. Preparation of these acids is described in detail in commonly assigned co-pending application of Litt et al., "Fluorinated Ethers," U.S. Ser. No. 492,276, filed Oct. 1, 1965, now U.S. Pat. 3,453,333 referred to as above.

The esters and acid halides of the above-described acids may be prepared from the acids by conventional procedures.

While the telomers of Formula V, above, and the fluorinated carboxylic acid reactants derived therefrom, may be prepared as discrete compounds, they are generally obtained as mixtures of compounds of varying chain length. It is to be understood that both, the individual discrete fluorinated carboxylic acid reactants as well as their mixtures of compounds of varying chain length are suitable for the preparation of the fluorinated amide compounds employed in the preparation of the compounds of the present invention.

Preparation of the above-described acids wherein $R_f$ has the Formula IV, above, is described in more detail in commonly assigned copending applications of Anello et al., U.S. Ser. Nos. 721,115 and 721,117, both filed Apr. 12, 1968, respectively entitled "Fluorocarbon Acids and Derivatives" and "Fluorocarbon Compounds," the pertinent subject matter of which applications is hereby incorporated by reference.

The fluorine-containing polyamide reactants of Formula II, above, may be prepared by simply mixing the fluorinated carboxylic acid reactant with the polyalkylene polyamine starting material of Formula III, above. These reactants may be charged in a molar proportion of 1 mol of polyalkylene polyamine to about 1 to 7 mols of fluorinated carboxylic acid reactant. If desired, the reaction may be carried out in the presence of a suitable inert organic solvent. Suitable reaction temperatures range between about 0° C. to about 200° C. Upon conclusion of the reaction, the desired fluorinated amide compound may be recovered from the reaction mixture by methods known to those skilled in the art.

The reaction product, obtained as a result of the reaction of the fluorinated carboxylic acid reactant and the polyalkylene polyamine reactant above described, may comprise a single compound conforming to the above-stated structural Formula II, a mixture of isomers thereof or a reaction mass composed of amide products containing two or more amide functions depending upon the polyalkylene polyamine reactant employed, the reactivity of the fluorinated carboxylic acid reactant present, the solubility of the amide product obtained during the reaction in the reaction mixture and the molar proportions of fluorinated carboxylic acid reactant employed. The resulting fluorine-containing polyamide product whether it comprises a single compound, a mixture of isomers thereof or a mass composed of amide products containing two or more amide functions, is suitable without further purification for reaction with the hydrocarbon acyl halide reactant, above described, to form the fluorocarbon derivatives of the present invention. However, if desired, the fluorine-containing polyamide may be further purified prior to reaction with the hydrocarbon acyl halide reactant, as by distillation or recrystallization using any commonly employed inert organic solvent such as acetonitrile or chloroform.

DESCRIPTION OF THE PREFERRED EMBODIMENT

The novel fluorocarbon derivatives of this invention are prepared by reacting the hydrocarbon acyl halide reactant with the fluorine-containing polyamide starting material, above described. These reactants may be charged in a mol proportion of 1 mol of fluorine-containing polyamide to about 1 to 10, preferably about 2 to 4, mols of hydrocarbon acyl halide reactant. Reaction temperature and time are dependent upon the particular fluorine-containing polyamide and hydrocarbon acyl halide reactants involved. The temperature ranges from about 0° C. to about 160° C., preferably about 10° C. to about 60° C. The reaction is quite rapid even at about room temperature. Reaction times generally range between about 10 minutes and about 4 hours. If desired, the reaction may be conducted in the presence of an inert organic solvent and, when present, the maximum temperature employable is limited only by the reflux temperature of the reaction mixture. Although the reaction may be carried out under superatmospheric pressure, it is preferred to conduct the reaction at atmospheric pressure.

The reaction of the fluorine-containing polyamide starting material with the hydrocarbon acyl halide reactant yields as by-product the halide salt of the polyamide starting material, as illustrated by the equation below which shows the reaction of 1,7-bis(perfluorooctanoyl)-1,4,7-triazaheptane with stearoyl chloride:

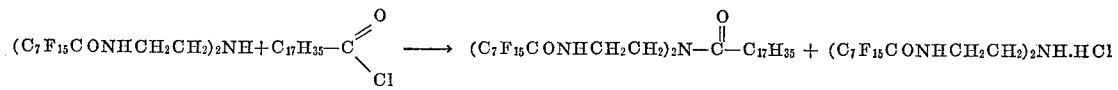

Upon completion of the reaction the desired product can be recovered from the reaction mixture by conventional methods, as, for example, by drowning the reaction mixture in cold water to precipitate the crude product, which can be recovered by filtration, and can be purified, if desired, by conventional methods, such as fractional crystallization. In a preferred embodiment, the reaction is conducted in a solvent medium which dissolves the starting materials and the desired product, but which does not dissolve the by-product amide salt. Acetone and pyridine are exemplary solvents having these characteristics. When the reaction is conducted in a solvent of that type product recovery is facilitated in that upon completion of the reaction the by-product amide salt can be removed by filtration. The desired product can then be recovered from the clear filtrate, as by evaporation of the solvent therefrom, under reduced pressure, if desired, or the desired product can be precipitated therefrom, as by drowning the clear filtrate in water or any other suitable non-solvent for the product. The product can then be recovered by filtration, and can be purified, if desired, as e.g., by fractional crystallization.

The reaction is preferably carried out in the presence of an acid interceptor, such as sodium bicarbonate, pyridine, triethylamine and the like, to thereby increase the yield of the desired product and to reduce the proportion of by-product amide salt formed in the reaction.

Since the hydrocarbon acyl halide reactant is decomposed by water, the reaction is preferably carried out under exclusion of water using anhydrous reagents.

The alkylene linkage ($C_xH_{2x}$) in the novel compounds of the present invention may be a straight-chain or branched-chain group, preferably containing from 2 to 4 carbon atoms.

The $R_f$ groups in the novel fluorocarbon derivatives of the present invention may be the same or different. When the $R_f$ group is a perfluoroalkyl group, it may be straight-chain or branched-chain, preferably containing from 6 to 14 carbon atoms.

When the $R_f$ group is a fluorinated isoalkoxyalkyl group represented by Formula IV, above, then, in the

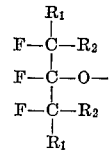

moiety, $R_1$ and $R_2$ are preferably fluorine or perfluoroalkyl groups. When perfluoroalkyl groups, $R_1$ and $R_2$ preferably contain 1–2 carbon atoms. When the $R_1$ and $R_2$ groups contain hydrogen substitution, the atomic ratio of fluorine to hydrogen is at least 1:1.

In preferred embodiments integer $m$ in the $R_f$ radical of Formula IV, above, is at least 1, and the sum of $m$ and $n$ is preferably from 1 to 10. Specific examples of preferred embodiments of the preferred

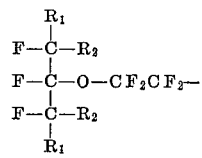

moiety of $R_f$ radicals of the compounds of the present invention include the following:

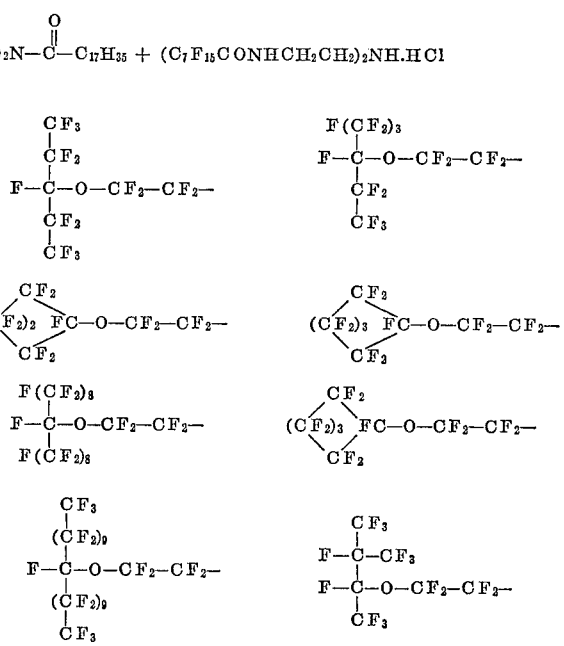

Compounds according to the formula

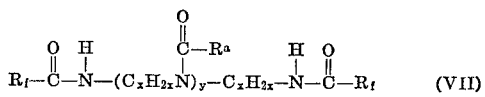

(VII)

wherein $R_f$, $R^a$ and $y$ have the afore-stated meanings and $x$ is an integer from 2 to 4 constitute preferred embodiments of the present invention, those wherein $R^a$ is an alkly radical, straight-chain or branched-chain, having from 10 to 20 carbon atoms being more preferred yet.

A specific class of preferred embodiments of the present invention are compounds according to Formula VII, above, wherein the $R_f$ radical has the formula $$(CF_3)_2CFO\text{---}(CF_2CF_2)_m\text{---}(CH_2CH_2)_n\text{---}(CX_2)_p\text{---}$$

wherein $m$ is an integer from 1 to 10, $n$ is an integer from 0 to 10, with the proviso that the sum of $m$ and $n$ is from 1 to 10, and wherein X and $p$ have the afore-stated meanings.

The following examples relate to the preparation of representative compounds of the present invention but are not intended to be limiting on the scope thereof.

EXAMPLE 1

Fifteen g. (0.050 mol) of stearoyl chloride is added dropwise at 30° C. to a solution of 1,7-bis(perfluorooctanoyl)-1,4,7-triazaheptane (44.75 g., 0.05 mol) in 400 ml. of anhydrous acetone containing 5.0 g. (0.05 mol) of triethylamine. The mixture is stirred and heated for one hour at 50° C. The mixture is then cooled to about room temperature, is filtered to remove the by-product amide salt formed in the reaction, and the clear filtrate is drowned in about 1 liter of cold water to precipitate the crude product. The crude product is recovered by filtration and is recrystallized from benzene to yield 45 grams of 1,7-bis(perfluorooctanoyl)-4-stearoyl-1,4,7 - triazaheptane having the formula $$C_7F_{15}\overset{O}{\underset{\|}{\text{--}C\text{--}}}\overset{H}{\underset{|}{N}}\text{--}CH_2CH_2\text{--}\overset{O=C\text{--}C_{17}H_{35}}{\underset{|}{N}}\text{--}CH_2CH_2\text{--}\overset{H}{\underset{|}{N}}\overset{O}{\underset{\|}{\text{--}C\text{--}}}C_7F_{15}$$

A portion of that recrystallized product is recrystallized twice, first from acetonitrile, then from acetone, to obtain a sample for analysis, M.P. 114°–115° C.

Elemental analysis of the analytical sample compares with calculated values for $C_{38}H_{45}N_3F_{30}O_3$ as follows:

| | Calculated | Analysis |
|---|---|---|
| Percent: | | |
| C | 39.2 | 39.26 |
| H | 3.91 | 3.71 |
| N | 3.62 | 3.47 |
| F | 49.0 | 48.61 |

The 1,7-bis(perfluorooctanoyl) - 1,4,7 - triazaheptane is prepared in the following manner:

A solution of 49 grams (0.475 mol) of diethylene triamine in 60 ml. of diethyl ether is placed in a reaction vessel equipped with a dropping funnel, condenser, magnetic stirrer and a calcium chloride drying tube. After chilling the vessel in an ice water bath for a period of about 20 minutes, 34.2 grams (0.079 mol) of n-perfluorooctanoyl chloride is added with stirring to the contents of the vessel during a 30 minute period. After the addition of the n-perfluorooctanoyl chloride reactant is complete, the ice water bath is removed and the stirring is continued at room temperature for a period of 20 minutes. Thereafter, 100 ml. of an 8% aqueous sodium hydroxide solution is added to the reaction mixture and the stirring is continued for an additional 15 minutes. The resulting gelatinous precipitate is filtered at reduced pressure and washed with water. After air drying the precipitate, a yield of about 31 grams of 1,7-di-n-perfluorooctanoyl-1,4,7-triazaheptane, a white solid (melting point 94–97° C.), having the following structural formula is obtained:

$$C_7F_{15}\overset{O}{\underset{\|}{\text{--}C\text{--}}}NHCH_2CH_2NHCH_2CH_2NH\overset{O}{\underset{\|}{\text{--}C\text{--}}}C_7F_{15}$$

EXAMPLE 2

Following the procedure set forth in Example 1 there is reacted 1,9-bis(perfluorooctanoyl)-1,5,9-triazanonane with searoyl chloride to obtain as product the compound $$C_7F_{15}\overset{O}{\underset{\|}{\text{--}C\text{--}}}\overset{H}{\underset{|}{N}}\text{--}CH_2CH_2CH_2\text{--}\underset{\underset{C_{17}H_{35}}{\overset{|}{O=C\text{--}}}}{N}\text{--}CH_2CH_2CH_2\text{--}\overset{H}{\underset{|}{N}}\overset{O}{\underset{\|}{\text{--}C\text{--}}}C_7F_{15}$$

The 1,9-bis(perfluorooctanoyl)-1,5,9 - triazanonane reactant is prepared in the following manner:

To a solution of 20 g. (0.0467 mol) of methyl-n-perfluorooctanoate in 25 ml. of diethyl ether there is added 3.07 g. (0.0235 mol) of di-n-propylene triamine. The resulting solution is heated under reflux temperature for a period of 24 hours. After removal of the solvent under reduced pressure, 16.6 g. of a light yellow oil which solidifies in about 30 minutes to give a white sticky solid is obtained. The white sticky solid is recrystallized from acetonitrile to yield 1,9-bis(perfluorooctanoyl)-1,5,9-triazanonane (a white powder melting at 84–85° C.) having the following structural formula:

$$C_7F_{15}\overset{O}{\underset{\|}{\text{--}C\text{--}}}NH\text{--}CH_2CH_2CH_2\text{--}NH\text{--}CH_2CH_2CH_2\text{--}NH\overset{O}{\underset{\|}{\text{--}C\text{--}}}C_7F_{15}$$

EXAMPLE 3

Following the procedure set forth in Example 1 there is reacted the amide $$[(CF_3)_2CFO\text{---}(CF_2)_5CONHCH_2CH_2CH_2]_2NH$$

with stearoyl chloride to obtain as product the compound $$[(CF_3)_2CFO\text{---}(CF_2)_5CONHCH_2CH_2CH_2]_2N\overset{O}{\underset{\|}{\text{--}C\text{--}}}C_{17}H_{35}$$

The amide reactant is prepared in the following manner:

To a solution of 24.7 g. (0.05 mol) of $$(CF_3)_2CFO\text{---}(CF_2)_5COOCH_3$$

in 25 ml. of diethyl ether there is added 3.07 g. (0.0235 mol) of di-n-propylene triamine. The resulting solution is heated under reflux for a period of 24 hours. After removal of the solvent under reduced pressure there is obtained the crude product $$[(CF_3)_2CFO\text{---}(CF_2)_5CONHCH_2CH_2CH_2]_2NH$$

which can be purified by recrystallization from acetonitrile.

EXAMPLE 4

Sixty milliliters of a solution of 2.4 g. (0.008 mol) of stearoyl chloride in anhydrous ether is slowly added to a stirred solution of 15 g. (0.016 mol) of 1,10-bis(perfluorooctanoyl)-1,4,7,10-tetraazadecane in 150 ml. of anhydrous pyridine. The solution is heated for 30 minutes at 40° C., is cooled to about room temperature and is filtered. The clear filtrate is drowned in 1 liter of cold water to precipitate the crude product. The precipitated product is washed with cold water. There are thus obtained 20 g. of wet product which is air dried. The air dried product is extracted with 800 ml. of carbon tetrachloride. Approximately 5.0 g. of material having a melting point of 190°–193° C. remains after extraction. Infrared analysis indicates that this is the hydrochloride salt of the amide starting material. The carbon tetrachloride solution is permitted to stand overnight. A precipitate forms which is recovered by filtration. The precipitate (7.5 g.) is identified as crude 1,10-bis(perfluorooctanoyl)-4,7-bis(stearoyl)-1,4,7,10-tetraazadecane. A portion of that product is subjected to recrystallization from ethanol and acetone to obtain an analytical sample, M.P. 154°–155° C.

Elemental analysis of the recrystallized product compares with calculated values for $C_{58}H_{84}N_4O_4F_{30}$ as follows:

| | Calculated | Analysis |
|---|---|---|
| Percent: | | |
| C | 47.4 | 47.4 |
| H | 5.72 | 5.55 |
| N | 3.81 | 3.97 |
| F | 38.8 | 38.4 |

EXAMPLES 5–32

In a manner analogous to that described in the above examples, other compounds illustrative of the present invention may be prepared as follows:

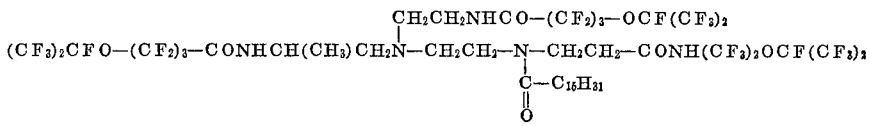

by reaction of 1,7 - bis[perfluoro(3 - oxa - 4-methylpentanoyl)]-1,4,7-triazaheptane with n-undecanoyl chloride.

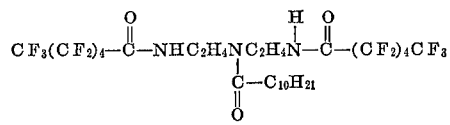

by reaction of 1,7-di-n-perfluorohexanoyl-1,4,7-triazaheptane with n-undecanoyl bromide.

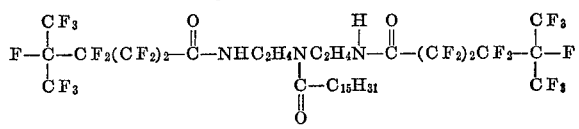

by reaction of 1,7-bis[perfluoro(5-methylhexanoyl)]-1,4,7-triazaheptane with n-palmityl chloride.

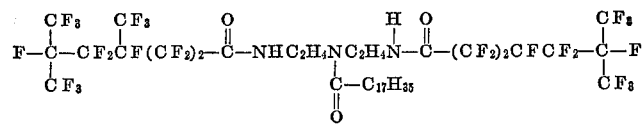

by reaction of 1,7-bis[perfluoro(4,6-dimethylheptanoyl)]-1,4,7-triazaheptane with n-stearoyl chloride.

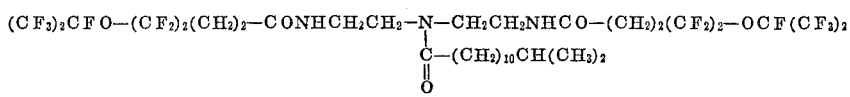

by reaction of 1,10 - bis[perfluoro(5 - oxa - 6-methylheptanoyl)] - 2 - methyl - 4-{2-[perfluoro(5-oxa-6-methylheptanamido)]ethyl} - 1,4,7,10-tetraazadecane with n-palmityl chloride.

by reaction of 1,7-bis[2,2,3,3-tetrahydroperfluoro(6-oxa-7 - methyl octanoyl)] - 1,4,7 - triazaheptane with 12-methyltridecanoyl chloride.

$$[(CF_3)_2CFO-(CF_2)_5-CONHC_2H_4]_2N-COC_{17}H_{35}$$

by reaction of 1,7 - bis[perfluoro(7 - oxa-8-methylnonanolyl]-1,4,7-triazaheptane with stearoyl chloride.

$$[(CF_3)_2CFO-(CF_2)_2-(CH_2)_2CONHC_2H_4]_2-\\N-COC_{20}H_{41}$$

by reaction of 1,7-bis[2,2,3,3-tetrahydroperfluoro(6-oxa-7-methyloctanoyl)]-1,4,7-triazaheptane with n-heneicosanoyl chloride.

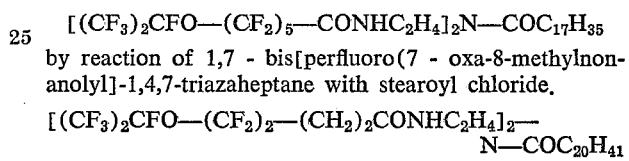

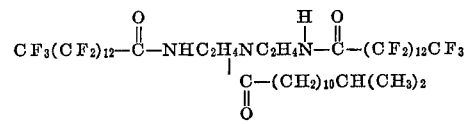

by reaction of 1,7-di-n-perfluorotetradecanoyl-1,4,7-triazaheptane with 12-methyltridecanoyl chloride.

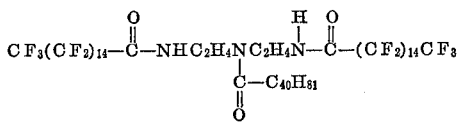

by reaction of 1,7-di-n-perfluorohexadecanoyl-1,4,7-triazaheptane with n-untetracontanoyl chloride.

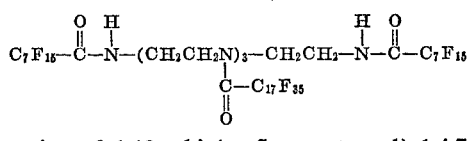

by reaction of 1,13 - bis(perfluorooctanoyl)-1,4,7,10,13-pentaazatridecane with stearoyl fluoride.

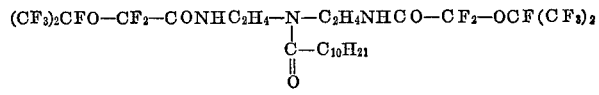

by reaction of 1,13-bis[perfluoro(3-oxa-4-methylpentanoyl)] - 4 - (6 - hydroxyhexyl)-10-methyl-1,4,7,10,13-pentaazatridecane with stearoyl chloride.

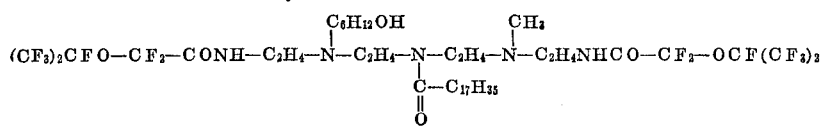

by reaction of 1,9-bis[12-perfluoro(11-oxa-12-methyltridecyl)-dodecanoyl] -13- hexyl-1,5,9,13-tetraazatridecane with n-palmityl chloride.

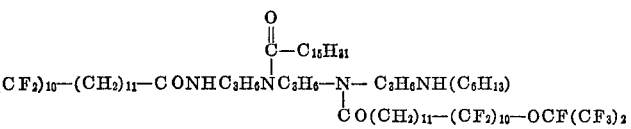

by reaction of 1,4 - bis[perfluoro(5 - oxa - 6 - methylheptanoyl)] - 10 - (6 - hydroxyhexyl)-1,4,7,10-tetraazadecane with stearoyl chloride.

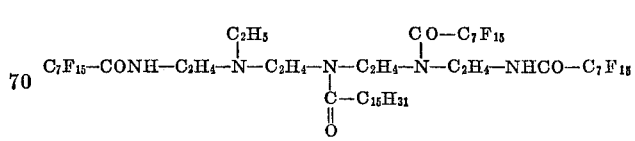

by reaction of 1,10,13 - tris(perfluorooctanoyl)-4-ethyl-1,4,7,10,13-pentaazatridecane with n-palmityl chloride.

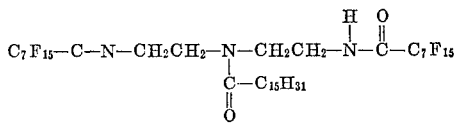

by reaction of 1,7 - bis(perfluorooctanoyl)-1,4,7-triazaheptane with n-palmityl chloride.

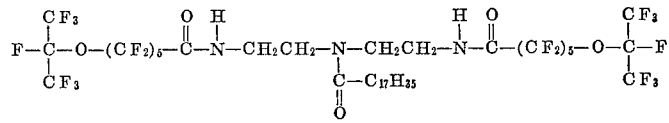

by reaction of 1,7-bis[perfluoro(7-oxa-8-methylnonanoyl)]-1,4,7-triazaheptane with stearoyl chloride.

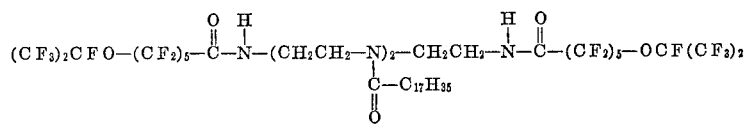

by reaction of 1,10 - bis[perfluoro(7 - oxa - 8 - methylnonanolyl)]-1,4,7,10-tetraazadecane with stearoyl chloride.

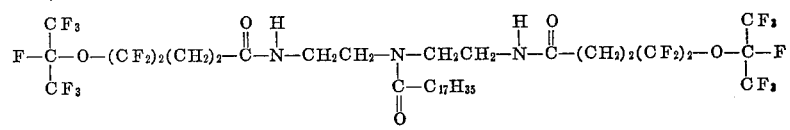

by reaction of 1,7-bis[2,2,3,3-tetrahydroperfluoro(6-oxa-7 - methyloctanoyl)] - 1,4,7-triazaheptane with stearoyl chloride.

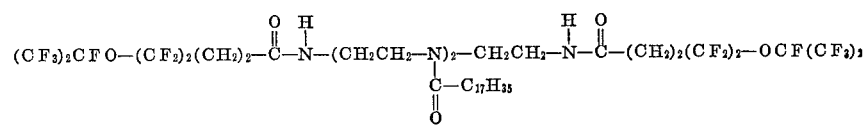

by reaction of 1,10 - bis[2,2,3,3-tetrahydroperfluoro(6-oxa - 7 methyloctanoyl)] - 1,4,7,10 - tetraazadecane with stearoyl chloride.

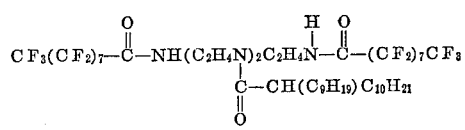

by reaction of 1,10-di-n-perfluorononanoyl-1,4,7,10-tetraazadecane with 2-nonyl-dodecanoyl iodide.

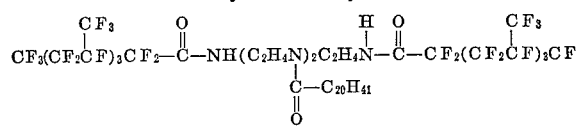

by reaction of 1,10 - bis[perfluoro(3,5,7 - trimethylnonanoyl)] - 1,4,7,10 - tetraazadecane with n-heneicosanoyl chloride.

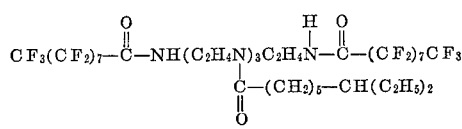

by reaction of 1,13-di-n-perfluorononanoyl - 1,4,7,10,13-pentaazatridecane with 7-ethylnonanoyl chloride.

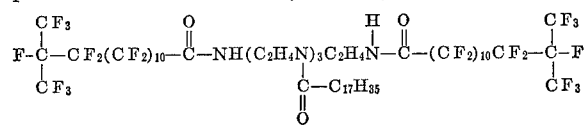

by reaction of 1,13 - bis[perfluoro(13 - methyltetradecanoyl)] - 1,4,7,10,13 - pentaazatridecane with stearoyl chloride.

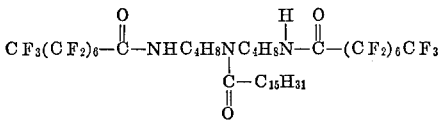

by reaction of 1,11-di-n-perfluorooctanoyl-1,6,11-triazaundecane with n-palmityl chloride.

$$CF_3(CF_2)_6-\overset{O}{\overset{\|}{C}}-NHC_4H_8N\underset{\underset{C_{15}H_{31}}{\overset{|}{C}}}{\overset{H}{\overset{|}{N}}}\overset{O}{\overset{\|}{C}}-(CF_2)_6CF_3$$

(structure for 45)

by reaction of 1,13 - bis[perfluoro(5 - methylhexanoyl)]-1,5,9,13 - tetraazatridecane with 13 - methyl-eicosanoyl chloride.

$$CF_3(CF_2)_6-\overset{O}{\overset{\|}{C}}-NHCH_2CH_2N-CH_2CH_2N-CH_2CH_2-\underset{\underset{O}{\overset{\|}{C}-C_{17}H_{35}}}{\overset{CH_2CH_2NH_2}{|}}-(CF_2)_6CF_3$$

by reaction of 1,10 - n-di-perfluorooctanoyl - 7 - (2-aminoethyl) - 1,4,7,10 - tetraazadecane with stearoyl chloride.

by reaction of 1,10 - di-n-perfluorooctanoyl - 7 - (2-n-perfluorooctanamidoethyl) - 1,4,7,10 - tetraazadecane with stearoyl chloride.

The novel compounds of the present invention are useful in treating fibrous material such as paper and textiles to make them repellent to oil and greasy stains. In addition, other materials such as the surfaces of wood, plastics, glass and metal may be treated with solutions dispersions or emulsions containing the novel compounds of the invention to make them oil- and stain-repellent.

These compounds also impart some water-repellency to these materials so treated.

The fluorocarbon compounds of the present invention may be applied to the article by treating the same with a solution or dispersion of the repellent and evaporating the solvent or dispersant. If desired, the treated article may then be cured at an elevated temperature. The concentration of the fluorocarbon compound on the treated article generally may vary from about 0.5% to about 10%, preferably about 1% to 5%, based on the weight of the article. The solvent used in applying the fluorocarbon compounds of the present invention functions as a carrier for the fluorocarbon compound. Any organic liquid inert to the article to be treated and capable of dissolving or dispersing the compound may be employed. Hydrocarbons, acetones, methyl ethyl ketone, acetonitrile and dimethylformamide are illustrative of suitable solvents. Fluorinated oil-repellency agents are not usually soluble in hydrocarbon solvents. Solubility of the fluorocarbon compounds of the present invention in hydrocarbon solvents is believed to be due to presence in the molecule of the hydrocarbon moiety derived from the hydrocarbon acyl halide reactant. Solubility of the invention compounds in hydrocarbon solvents is highly advantageous since it allows use of low cost solvents in oil-repellency treatment.

The result of a test relating to the use of a typical hydrocarbon derivative of the present invention as oil-repellent agent on textiles is shown below.

The procedure employed in determining the oil-repellency rating on textiles is described, for example, on pages 323-324 of the April 1962 edition of the Textile Research Journal. This procedure involves gently placing on the treated fabric drops of mixtures of mineral oil ("Nujol") and n-heptane in varying proportions. The drops are allowed to stand on the treated fabric undisturbed for 3 minutes. After the 3 minute time period the wetting and penetration of the fabric is visually observed. The number corresponding to the highest percentage of heptane which does not penetrate or wet the fabric is considered to be the oil-repellency rating of the treated fabric.

Test pieces of 80 x 80 count cotton print cloth were impregnated with a 4% xylene solution of 1,7-bis(perfluorooctanoyl)-4-stearoyl - 1,4,7 - triazaheptane by total immersion for two minutes, were wrung out and were air dried overnight. The specimens were then washed in warm water for 5 minutes, were wrung out and were dried at 100° C. for 5 minutes. The specimens were then ironed and conditioned at 50% R.H. Oil-repellency was determined by the above-described method. These specimens had an oil-repellency rating of 90, indicating good oil-repellency.

Various changes and modifications may be made in the invention without departing from the spirit thereof. It is intended that all matter contained in the above description shall be interpreted as illustrative and not in a limiting sense.

We claim:

1. Compounds having the structural formula

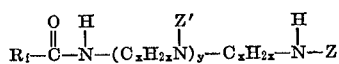

wherein (1) $R_f$ is a radical selected from the group consisting of
   (a) perfluoroalkyl having from 5 to 15 carbon atoms, and
   (b) a radical having the formula

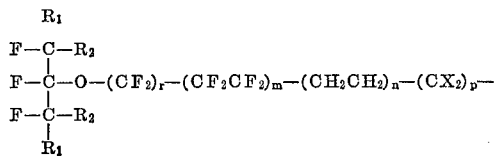

wherein
   (i) $R_1$ and $R_2$ are fluorine or are fluoroalkyl groups, or when taken together, are fluoroalkylene groups forming a homocyclic aliphatic structure, which $R_1$ and $R_2$ groups may each have from 1 to 9 carbon atoms, provided that not more than three of the $R_1$ and $R_2$ groups may be fluoroalkyl groups,
   (ii) $m$ and $n$ are each integers of from 0 to 20, with the proviso that the sum of $m$ and $n$ is from 0 to 20, and provided further that when $r$ is 0, $m$ is at least 1,
   (iii) X is selected from the group consisting of hydrogen and fluorine, with the proviso that when $n$ is greater than 0, then X is always hydrogen,
   (iv) $p$ is 0 or 1,
   (v) $r$ is 0 or 1, with the proviso that when the sum of $m$, $n$ and $p$ is greater than 0, then $r$ is always 0,
(2) $x$ is an integer from 2 to 6,
(3) $y$ is an integer from 1 to 4,
(4) Z is a member selected from the group consisting of
   (a) hydrogen,
   (b) alkyl having from 1 to 6 carbon atoms,
   (c) a radical having the formula —ROH wherein R is a divalent alkylene bridging group containing from 1 to 6 carbon atoms,
   (d) a fluorinated acyl radical having the formula

wherein $R_f$ has the afore-stated meaning, and
   (e) a hydrocarbon acyl radical having the formula

wherein $R^a$ is an alkyl radical having from 10 to 40 carbon atoms, and
(5) Z', which may be the same or different in different

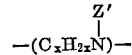

groups, is a member selected from the group consisting of
   (a) hydrogen,
   (b) alkyl having from 1 to 6 carbon atoms,
   (c) a radical having the formula —ROH wherein R is a divalent alkylene bridging group containing from 1 to 6 carbon atoms,
   (d) a fluorinated acyl radical having thhe formula

wherein $R_f$ has the afore-stated meaning,
   (e) a hydrocarbon acyl radical having the formula

wherein $R^a$ has the afore-stated meaning and
   (f) a radical having thhe formula

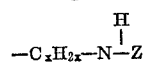

wherein x and Z have the afore-stated meanings, with the proviso that at least one of Z or Z' is a fluorinated acyl radical or one of Z' is a radical having the formula

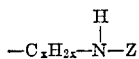

wherein Z is a fluorinated acyl radical, and at least one of Z or Z' is a hydrocarbon acyl radical or one of Z' is a radical having the formula

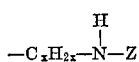

wherein Z is a hydrocarbon acyl radical, said fluorinated acyl radical and a hydrocarbon acyl radical having the afore-stated formulas.

2. Compounds according to claim 1 having the structural formula

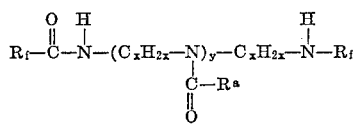

wherein $R_f$, $x$, $y$ and $R^a$ have the meanings given in claim 1.

3. Compounds according to claim 2 wherein $R_f$ is a perfluoroalkyl radical having from 6 to 14 carbon atoms.

4. Compounds according to claim 3 wherein $x$ is an integer from 2 to 4.

5. Compounds according to claim 4 wherein $R^a$ is an alkyl radical having from 10 to 20 carbon atoms.

6. A compound according to claim 5 having the structural formula

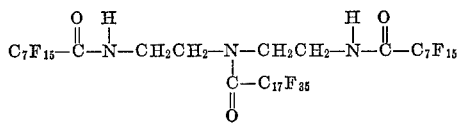

7. A compound according to claim 5 having the structural formula

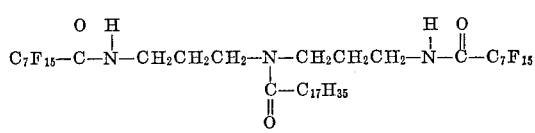

8. A compound according to claim 5 having the structural formula

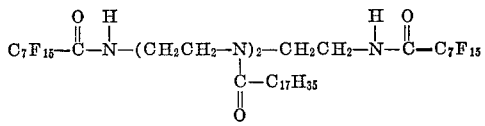

9. A compound according to claim 5 having the structural formula

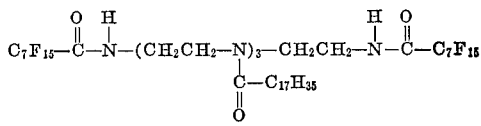

10. A compound according to claim 5 having the structural formula

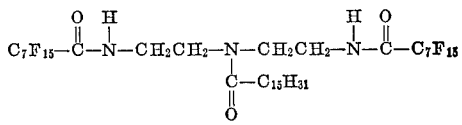

11. Compounds according to claim 1 having the structural formula

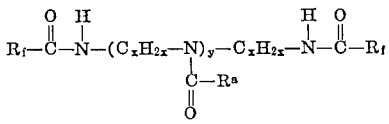

wherein $x$, $y$ and $R^a$ have the meanings given in claim 1 and wherein $R_f$ is a radical having the formula

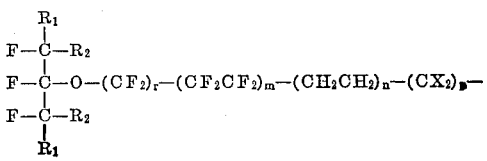

wherein $R_1$, $R_2$, $m$, $n$, $r$, $p$ and X have the meanings given in claim 1.

12. Compounds according to claim 11 wherein $x$ is an integer from 2 to 4 and wherein the $R_f$ radical has the formula $$(CF_3)_2CFO-(CF_2CF_2)_m-(CH_2CH_2)_n-(CX_2)_p-$$

wherein X and $p$ have the meanings given in claim 11, wherein $m$ is an integer from 1 to 10 and $n$ is an integer from 0 to 10, with the proviso that the sum of $m$ and $n$ is from 1 to 10.

13. Compounds according to claim 12 wherein $R^a$ is an alkyl radical having from 10 to 20 carbon atoms.

14. A compound according to claim 13 having the structural formula

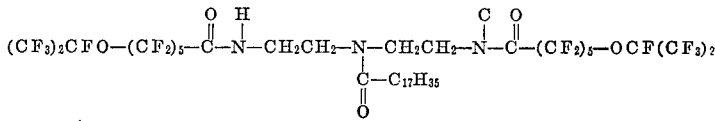

15. A compound according to claim 13 having the structural formula

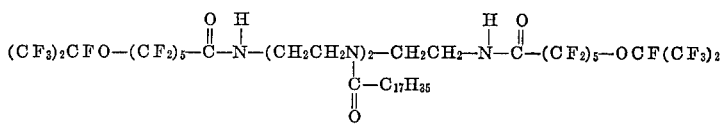

16. A compound according to claim 13 having the structural formula

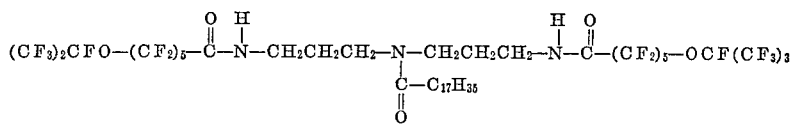

17. A compound according to claim 13 having the structural formula
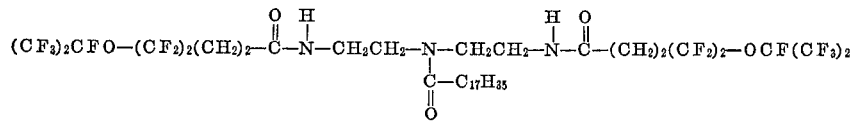
18. A compound according to claim 13 having the structural formula
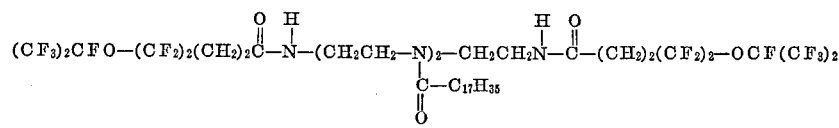
References Cited
UNITED STATES PATENTS
| | | | |
|---|---|---|---|
| 2,528,274 | 10/1950 | Gunderson | 260—404.5 |
| 2,593,737 | 4/1952 | Diesslin et al. | 260—514 |
| 3,038,820 | 6/1962 | Albrecht | 260—404.5 |
| 3,420,697 | 1/1969 | Sweeney et al. | 260—404.5 |
| 3,446,570 | 5/1969 | Sweeney et al. | 260—404.5 |
| 3,428,709 | 2/1969 | Kleiner | 260—404.5 |
| 3,453,333 | 7/1969 | Litt et al. | 260—633 |
| 3,458,571 | 7/1969 | Tokoli | 260—404.5 |
| 3,470,256 | 9/1969 | Evans et al. | 260—611 |
LEWIS GOTTS, Primary Examiner
G. HOLLRAH, Assistant Examiner
U.S. Cl. X.R.
8—115.5, 116.2, 119; 106—2; 117—126, 127, 134, 135.5, 138.8, 148, 155; 260—557, 561

UNITED STATES PATENT OFFICE
CERTIFICATE OF CORRECTION

PO-1050
(5/69)

Patent No. 3,577,447  Dated May 4, 1971

Inventor(s) Richard F. Sweeney, Alson K. Price

It is certified that error appears in the above-identified patent and that said Letters Patent are hereby corrected as shown below:

Column 11, in the formula bridging lines 45 to 47; that part of the formula reading:

"NHC$_2$H$_4$NC$_2$
$\phantom{NHC_2H_4N}$C−
$\phantom{NHC_2H_4N}$∥
$\phantom{NHC_2H_4N}$O "

should read

−−NHC$_2$H$_4$NC
$\phantom{NHC_2H_4N}$C−
$\phantom{NHC_2H_4N}$∥
$\phantom{NHC_2H_4N}$O −−.

UNITED STATES PATENT OFFICE
CERTIFICATE OF CORRECTION

Patent No. 3,577,447          Dated May 4, 1971

Inventor(s) Richard F. Sweeney, Alson K. Price

It is certified that error appears in the above-identified patent and that said Letters Patent are hereby corrected as shown below:

Claim 1, column 16, formula under (b); that part reading:

"$R_1$ $F-C-R_2$"      should read     -- $\begin{array}{c} R_1 \\ | \\ F-C-R_2 \end{array}$ --.

Claim 1, column 16, formula under (f); that part reading:

"$C_xH_{2x}-\underset{\underset{H}{|}}{N}-Z$"     should read     -- $C_xH_{2x}-\underset{\underset{H}{|}}{N}-Z$ --

Claim 7, in the formula; that part reading:

"$C_7F_{15}-\underset{}{C}-\underset{\underset{H}{|}}{N}-$" with O above C     should read     -- $C_7F_{15}-\overset{O}{\underset{}{C}}-\underset{\underset{H}{|}}{N}-$ --

UNITED STATES PATENT OFFICE
CERTIFICATE OF CORRECTION

Patent No. 3,577,447     Dated May 4, 1971

Inventor(s) Richard F. Sweeney, Alson K. Price

It is certified that error appears in the above-identified patent and that said Letters Patent are hereby corrected as shown below:

Claim 14, in the formula; that part reading $$\text{"N-}\overset{\underset{|}{C}}{\overset{O}{\|}}\text{"} \quad \text{should read} \quad \text{--N-}\overset{\underset{|}{H}}{\overset{O}{\|}}\text{C --}.$$

Signed and sealed this 15th day of May 1973.

(SEAL)
Attest:

EDWARD M. FLETCHER, JR.  
Attesting Officer

ROBERT GOTTSCHALK  
Commissioner of Patents

PO-1050
(5/69)

UNITED STATES PATENT OFFICE
CERTIFICATE OF CORRECTION

Patent No. 3,577,447    Dated May 4, 1971

Inventor(s) Richard F. Sweeney, Alson K. Price

It is certified that error appears in the above-identified patent and that said Letters Patent are hereby corrected as shown below:

Column 2, line 38, in the formula; that part of the formula reading "$-C-R^a-$" should read -- $-C-R_f$ --.

Column 2, line 42, 43 and 44, delete the formula $$"-C_xH_{2x}-\overset{H}{\underset{|}{N}}-Z"$$

and insert in lieu thereof:

$$--\ -\overset{O}{\underset{\|}{C}}-R^a-\ --.$$

Column 8, at the far right, the formula bridging lines 52 to 55; that part of the formula reading:

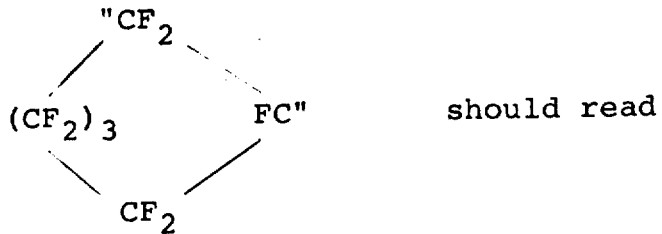    should read

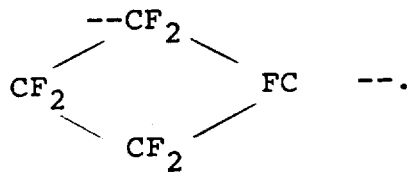    --.

UNITED STATES PATENT OFFICE
CERTIFICATE OF CORRECTION

Patent No. 3,577,447          Dated May 4, 1971

Inventor(s) Richard F. Sweeney, Alson K. Price

Page 2

It is certified that error appears in the above-identified patent and that said Letters Patent are hereby corrected as shown below:

Column 14, the formula bridging lines 60-65; that part of the formula reading:

$$\text{"CH}_2\text{CH}_2-\underset{H}{N}-(\text{CF}_2)_6\text{CF}_3\text{"} \quad \text{should read}$$

$$--\text{CH}_2\text{CH}_2-\underset{H}{\underset{|}{N}}-\underset{O}{\overset{\|}{C}}-(\text{CF}_2)_6\text{CF}_3--.$$

Signed and sealed this 19th day of February 1974.

(SEAL)
Attest:

EDWARD M. FLETCHER, JR.      C. MARSHALL DANN
Attesting Officer               Commissioner of Patents